United States Patent
Gopalan

(10) Patent No.: US 10,572,825 B2
(45) Date of Patent: Feb. 25, 2020

(54) INFERRING THE PRESENCE OF AN OCCLUDED ENTITY IN A VIDEO CAPTURED VIA DRONE

(71) Applicant: AT&T Intellectual Property I, L.P., Atlanta, GA (US)

(72) Inventor: Raghuraman Gopalan, Dublin, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 247 days.

(21) Appl. No.: 15/488,785

(22) Filed: Apr. 17, 2017

(65) Prior Publication Data

US 2018/0299886 A1    Oct. 18, 2018

(51) Int. Cl.
| | | |
|---|---|---|
| G06N 20/00 | (2019.01) | |
| G05D 1/00 | (2006.01) | |
| G06K 9/38 | (2006.01) | |
| G06K 9/00 | (2006.01) | |

(52) U.S. Cl.
CPC .......... *G06N 20/00* (2019.01); *G05D 1/0094* (2013.01); *G06K 9/0063* (2013.01); *G06K 9/38* (2013.01); *B64C 2201/12* (2013.01); *B64C 2201/127* (2013.01); *B64C 2201/14* (2013.01)

(58) Field of Classification Search
None
See application file for complete search history.

(56) References Cited

U.S. PATENT DOCUMENTS

| | | |
|---|---|---|
| 6,674,877 B1 | 1/2004 | Jojic et al. |
| 7,142,600 B1 | 11/2006 | Schonfeld et al. |
| 7,295,203 B2 | 11/2007 | Vincent |
| 7,999,848 B2 | 8/2011 | Chew |
| 8,294,763 B2 | 10/2012 | Cheng et al. |
| 8,520,956 B2 | 8/2013 | Bolme et al. |
| 8,611,591 B2 | 12/2013 | Coffman et al. |
| 8,712,679 B1 | 4/2014 | Mostofi et al. |
| 8,760,494 B1 | 6/2014 | Twede |
| 9,014,488 B2 | 4/2015 | Rubenstein et al. |
| 9,329,001 B2 | 5/2016 | Mohamadi |

(Continued)

FOREIGN PATENT DOCUMENTS

WO    2017021753 A1    2/2017

OTHER PUBLICATIONS

N. E. O'Connor et al., "Vehicle tracking in UAV video using multispectral spatiogram models." SPIE Defense and Security Symposium. International Society for Optics and Photonics, 2008. 10 Pages. http://www.dtic.mil/dtic/tr/fulltext/u2/a549939.pdf.

(Continued)

*Primary Examiner* — Abdhesh K Jha

(74) *Attorney, Agent, or Firm* — Haynes and Boone, LLP

(57) ABSTRACT

In one example, the present disclosure describes a device, computer-readable medium, and method for inferring the presence of an occluded entity in a video captured via drone. For instance, in one example, a video is obtained. The video is captured by a drone monitoring a field of view of a scene. It is determined, based on a combination of statistical reasoning and contextual modeling of the video, that an occluded entity is likely to be present, but not entirely visible, in the field of view. A signal is sent to the drone to instruct the drone to adjust its orientation to make the occluded entity more visible.

18 Claims, 4 Drawing Sheets

(56) References Cited

U.S. PATENT DOCUMENTS

| | | | |
|---|---|---|---|
| 9,495,764 B1 | 11/2016 | Boardman et al. | |
| 9,589,595 B2 | 3/2017 | Gao et al. | |
| 9,744,665 B1* | 8/2017 | Linnell | B25J 5/007 |
| 2010/0013917 A1 | 1/2010 | Hanna et al. | |
| 2012/0292503 A1* | 11/2012 | Phifer, Jr. | H01J 37/222 |
| | | | 250/307 |
| 2014/0064554 A1 | 3/2014 | Coulter et al. | |
| 2014/0347475 A1* | 11/2014 | Divakaran | G06K 9/00771 |
| | | | 348/135 |
| 2015/0071524 A1 | 3/2015 | Lee | |
| 2016/0140729 A1 | 5/2016 | Soatto et al. | |
| 2016/0314545 A1* | 10/2016 | Jessen | G06Q 30/0278 |
| 2017/0053538 A1 | 2/2017 | Samarasekera et al. | |
| 2017/0091953 A1 | 3/2017 | Bleiweiss et al. | |
| 2018/0059779 A1* | 3/2018 | Sisbot | B60R 1/00 |

OTHER PUBLICATIONS

Sze Kim Pang et al., "Video tracking using dual-tree wavelet polar matching and rao-blackwellised particle filter." EURASIP Journal on Advances in Signal Processing (2009). pp. 1-13. https://link.springer.com/content/pdf/10.1155%2F2009%2F620404.pdf.

Nikolai Vladimirovich Kim et al., "Organization Aspects of the Ground Objects Monitoring by Unmanned Aerial Vehicles in the Variable Observation Environment." ARPN Journal of Engineering and Applied Sciences, vol. 10, No. 20, pp. 9696-9705, (Nov. 2015). http://www.arpnjournals.org/jeas/research_papers/rp_2015/jeas_1115_2926.pdf.

Guang Shu et al., "Part-based multiple-person tracking with partial occlusion handling." Computer Vision and Pattern Recognition (CVPR), 2012 IEEE Conference, IEEE, Jun. 16, 2012. 7 Pages. http://crcv.ucf.edu/papers/1439.pdf.

"Inferring the "Dark Matter" and "Dark Energy" from Image and Video", vcla.stat.ucla.edu, accessed: Apr. 2017. 2 Pages. http://vcla.stat.ucla.edu/dark/.

* cited by examiner

INFERRING THE PRESENCE OF AN OCCLUDED ENTITY IN A VIDEO CAPTURED VIA DRONE

The present disclosure relates generally to computer vision, and relates more particularly to devices, non-transitory computer-readable media, and methods for determining when an entity is occluded in a video.

BACKGROUND

Drones are unmanned aerial vehicles (UAVs) that may be remotely controlled or may be flown autonomously (e.g., using computer vision processes). Although previously used largely in a military context, in recent years, civilian use of drones has become more widespread. For instance, drones are often used to capture video for the purposes of surveillance, traffic and weather monitoring, personalization, biometrics, and the like.

SUMMARY

In one example, the present disclosure describes a device, computer-readable medium, and method for inferring the presence of an occluded entity in a video captured via drone. For instance, in one example, a video is obtained. The video is captured by a drone monitoring a field of view of a scene. It is determined, based on a combination of statistical reasoning and contextual modeling of the video, that an occluded entity is likely to be present, but not entirely visible, in the field of view. A signal is sent to the drone to instruct the drone to adjust its orientation to make the occluded entity more visible.

In another example, a device includes a processor and a computer-readable medium storing instructions which, when executed by the processor, cause the processor to perform operations. The operations include obtaining a video that is captured by a drone monitoring a field of view of a scene, determining that an occluded entity is likely to be present, but not entirely visible, in the field of view based on a combination of statistical reasoning and contextual modeling of the video, and sending a signal to the drone to instruct the drone to adjust its orientation to make the occluded entity more visible.

In another example, a non-transitory computer-readable storage medium stores instructions which, when executed by a processor, cause the processor to perform operations. The operations include obtaining a video that is captured by a drone monitoring a field of view of a scene, determining that an occluded entity is likely to be present, but not entirely visible, in the field of view based on a combination of statistical reasoning and contextual modeling of the video, and sending a signal to the drone to instruct the drone to adjust its orientation to make the occluded entity more visible.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure infers the presence of an occluded entity in a video captured via drone. As discussed above, drones are often used to capture video for the purposes of surveillance, traffic and weather monitoring, personalization, biometrics, and the like. In many of these fields, an entity of interest (e.g., a person or an object) may be occluded in the captured video due to the field of view of the drone camera. That is, although the entity is present in a captured scene, it may not be entirely visible from the particular field of view of that scene that is captured by the drone camera (e.g., due to another object being positioned between the drone sensor and the occluded entity). Complicating the matter is the fact that the typical characteristics of videos captured via drone are different from the characteristics of video captured via handheld techniques or even via other aerial techniques.

Examples of the present disclosure provide a way of inferring when an entity is occluded from a particular field of view of a drone, and of responsively maneuvering the drone to a new field of view from which the target is no longer occluded. In one example, a combination of statistical reasoning and contextual modeling is used to infer when an occlusion is present in a video captured by a drone. The statistical reasoning helps to infer the presence of occlusions based on typical or expected characteristics of occlusions (as determined by analysis of historical or training videos). The contextual modeling helps to infer the presence of occluded entities from the presence of other contextually related entities in the field of view. If it is determined that an occlusion is likely to be present based on the statistical reasoning and contextual modeling, the orientation of the drone can be responsively maneuvered to confirm the presence of the occlusion and to adjust the field of view so that the occlusion is removed.

Figure 1:
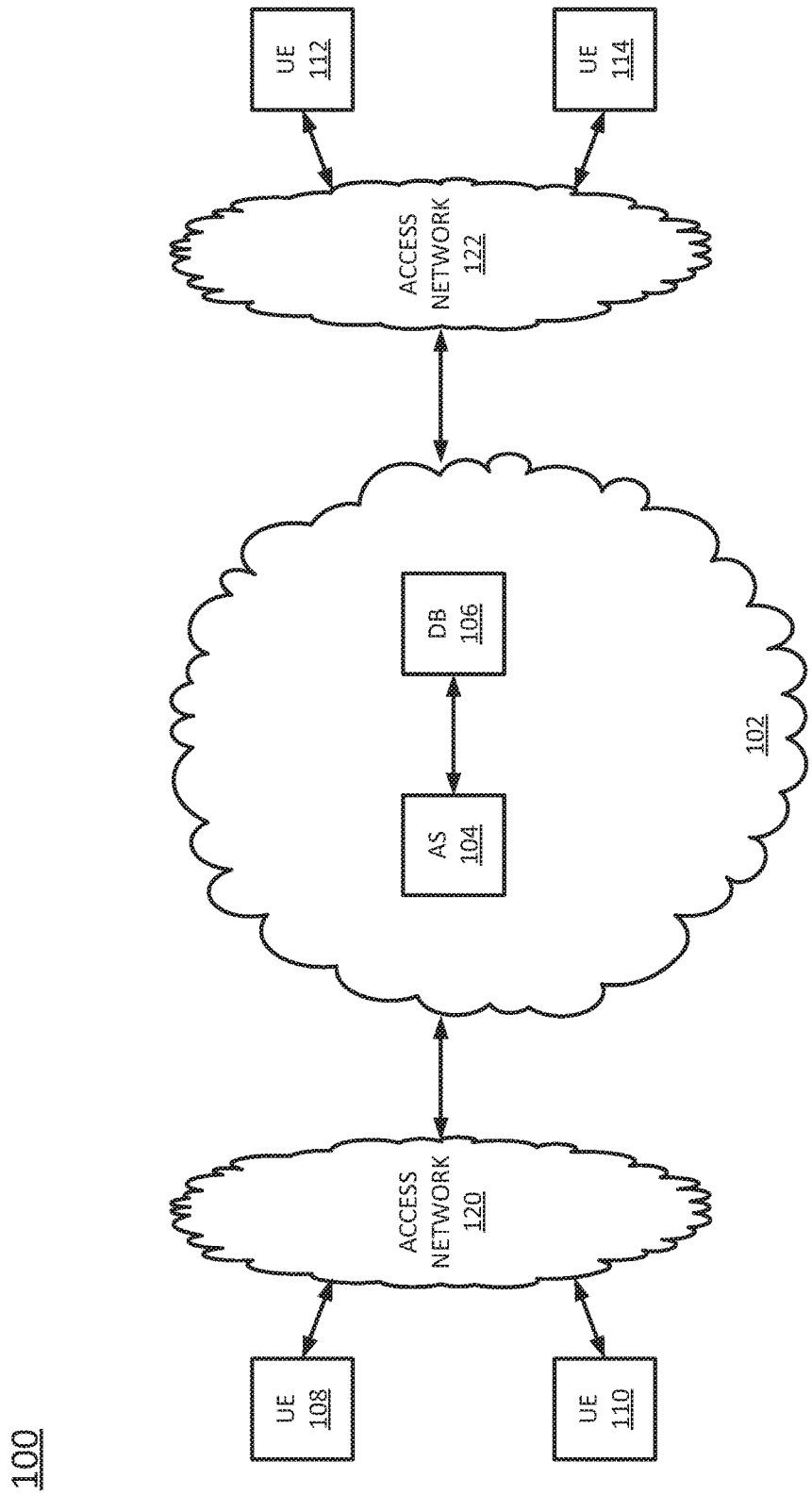
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, at least some of the UEs 108, 110, 112, and 114 are drones equipped with video cameras. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

Figure 4:
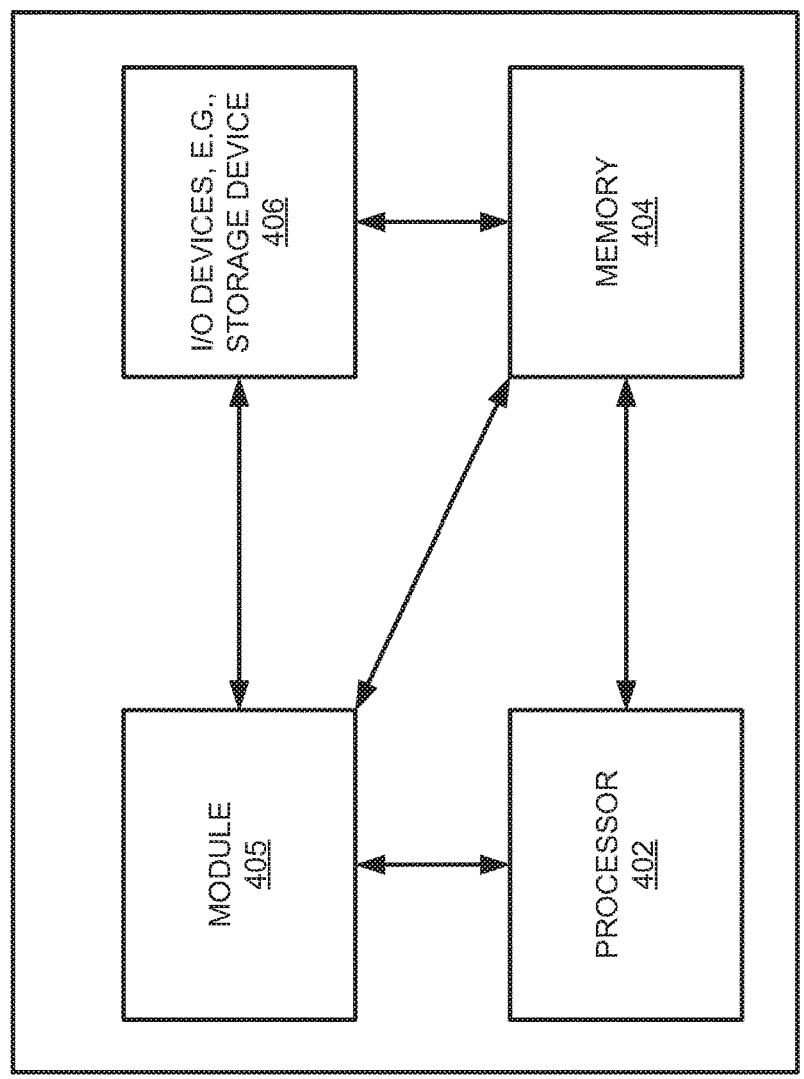
FIG. 4 depicts a high-level block diagram of a computing device specifically programmed to perform the functions described herein.

The AS 104 may comprise a general purpose computer as illustrated in FIG. 4 and discussed below. In one example, the AS 104 may perform the methods discussed below related to inferring the presence of an occluded entity in a video captured via drone. For instance, in one example, the AS 104 hosts an application that communicates with one or more of the UEs 108, 110, 112, and 114. As an example, the application may be a surveillance application, or a traffic or weather monitoring application, that subscribes to the output (e.g., video stream) of one or more of the UEs 108, 110, 112, and 114. In particular, the AS 104 may receive videos recorded by the UEs 108, 110, 112, and 114 and may analyze the videos to infer the presence of occluded entities. The AS 104 may further send signals to the UEs 108, 110, 112, and 114 instructing the UEs to adjust their orientations so that the videos they are recording are captured from a different field of view in which the entities are not occluded.

In one example, the DB 106 may store videos recorded by one or more of the UEs 108, 110, 112, or 114, e.g., by one or more drones. These videos may include videos that contain occlusions and videos that do not contain occlusions. These videos may be used to train the AS 104 to infer when an occluded entity is likely to be present (but not entirely visible) in a new video.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
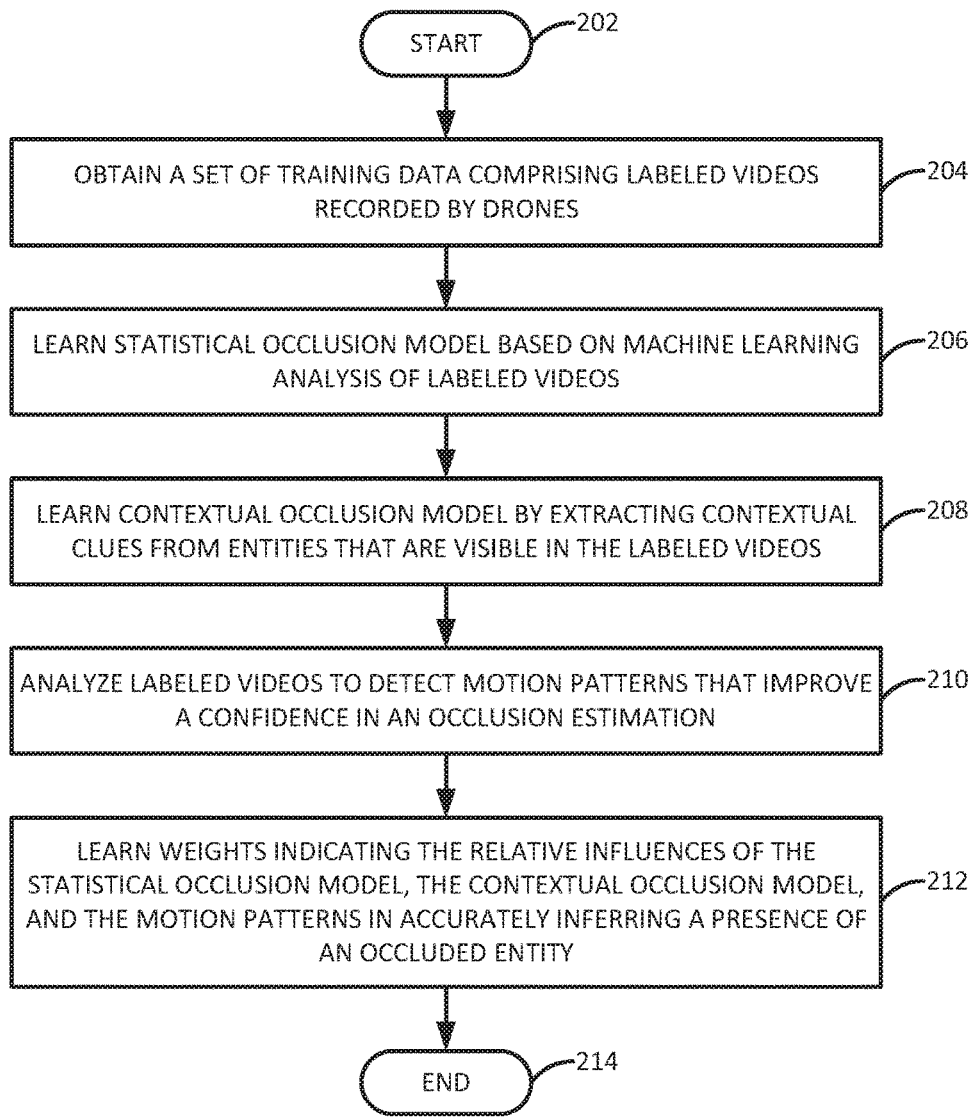
FIG. 2 illustrates a flowchart of an example method for training a system to infer the presence of an occluded entity in a video captured via drone.

To further aid in understanding the present disclosure, FIG. 2 illustrates a flowchart of an example method 200 for training a system to infer the presence of an occluded entity in a video captured via drone. In one example, the method 200 may be performed by an application server that subscribes to the output of one or more drones, e.g., AS 104 illustrated in FIG. 1. However, in other examples, the method 200 may be performed by another device. For instance, a UE 108, 110, 112, or 114 that is in communication with a drone, or even a UE that is a drone could also perform all or some steps of the method 200. As such, any references in the discussion of the method 200 to the AS 104 of FIG. 1 are not intended to limit the means by which the method 200 may be performed.

The method 200 begins in step 202. In step 204, the AS 104 obtains a set of training data. In one example, the training data comprises a collection of videos recorded by drones. At least some of the videos depict fields of view of scenes in which entities (e.g., people or objects) are occluded. Fields of view of scenes depicted in other videos do not include occluded entities. In one example, each of the videos in the training data is labeled, e.g., to indicate whether or not an occluded entity is present in the video. The training data may be stored, for example, in the DB 106.

In step 206, the AS 104 applies a statistical reasoning technique to the training data in order to learn (e.g., via machine learning) a statistical occlusion model, e.g., a model that determines how likely it is that an occluded entity is present in a field of view based on feature descriptions of entities that are visible in the field of view. In this case, the labels associated with the videos may help the AS 104 to learn features (e.g., via a machine learning technique) that are statistically likely to indicate the presence of an occluded entity.

In step 208, the AS 104 applies a contextual modeling technique to the training data in order to learn a contextual occlusion model, e.g., a model that determines how likely it is that an occluded entity is present in a field of view based on contextual clues extracted from entities that are easily visible in the field of view (e.g., entities that often accompany the potentially occluded entity, and from which a presence of the occluded entity can be inferred). In this example, a relevant context from which clues can be extracted may be an appearance context, a social context, a color/texture/shape co-occurrence context, or the like. For instance, if the side of a boat is visible in a field of view, it may be inferred, from this context, that water is likely to be present nearby (e.g., perhaps just outside the field of view).

In step 210, the AS 104 analyzes a plurality of different views of the same scene to learn how maneuvering of a drone improves the confidence in an occlusion estimation. In one example, the AS 104 analyzes the different views for motion patterns (e.g., encompassing a full range of pitch, yaw, and roll) that improve the confidence.

In step 212, the AS 104 learns weights for the statistical occlusion model, the contextual occlusion model, and the motion patterns. In one example, the weights indicate the relative influences of the statistical occlusion model, the contextual occlusion model, and the drone maneuvering in accurately inferring the presence of an occluded entity in a field of view. The results of the statistical occlusion model, the contextual occlusion model, and the drone maneuvering, as applied to a given video, may be weighted and aggregated in order to generate a final score that indicates the likelihood of an occluded entity being present.

The method 200 ends in step 214.

Figure 3:
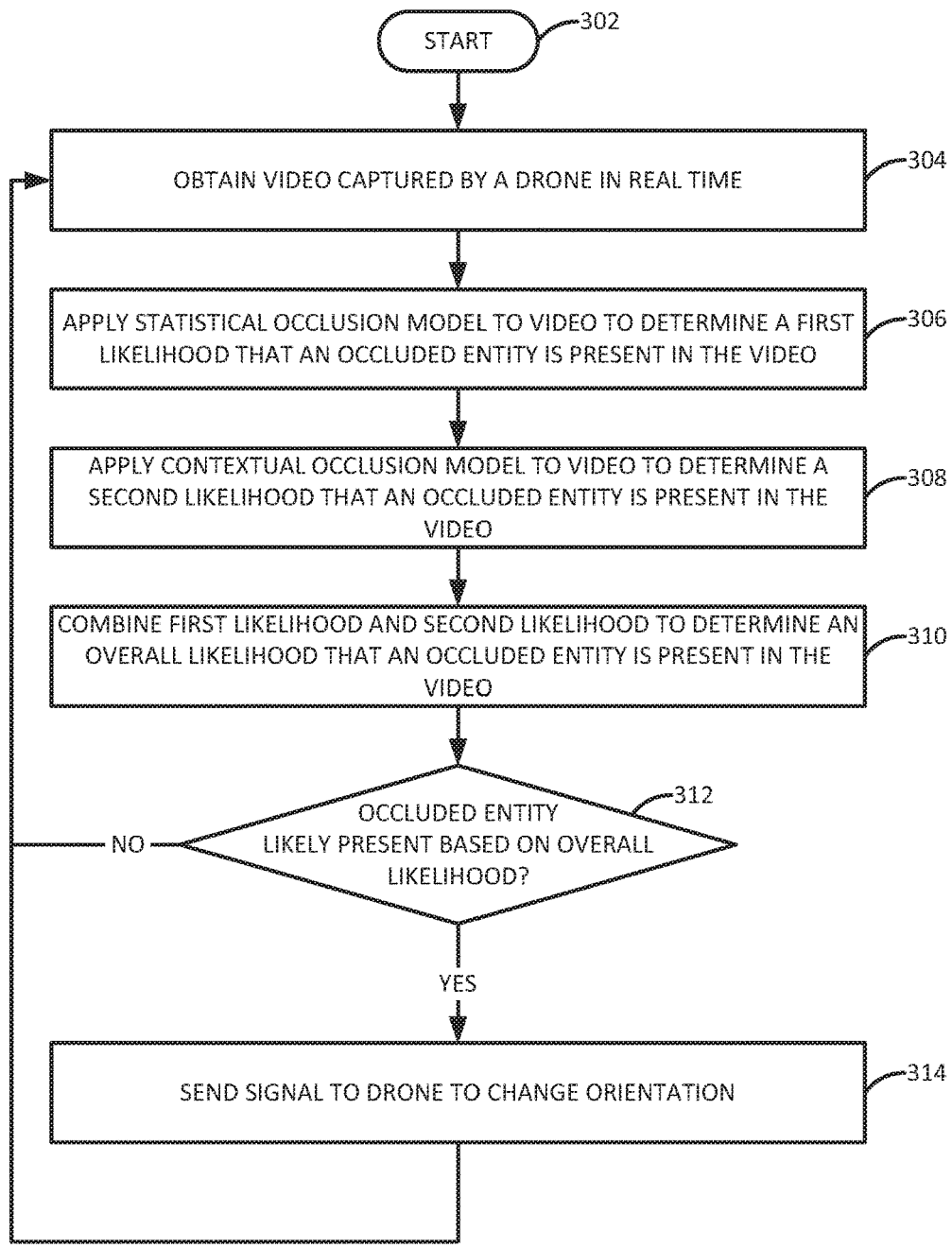
FIG. 3 illustrates a flowchart of an example method for inferring the presence of an occluded entity in a video captured via drone.

FIG. 3 illustrates a flowchart of an example method 300 for inferring the presence of an occluded entity in a video captured via drone. In one example, the method 300 may be performed by an application server that subscribes to the output of one or more drones, e.g., AS 104 illustrated in FIG. 1. However, in other examples, the method 300 may be performed by another device. For instance, a UE 108, 110, 112, or 114 that is in communication with a drone, or even a UE that is a drone could also perform all or some steps of the method 200. As such, any references in the discussion of the method 300 to the AS 104 of FIG. 1 are not intended to limit the means by which the method 300 may be performed.

The method 300 begins in step 302. In step 304, the AS 104 obtains a video captured by a drone which may be monitoring a scene. The video may depict the scene from a particular field of view. The video may be obtained directly from the drone in real time (e.g., streaming from the drone as the frames of the video are captured, subject to any network delay, buffering, or the like).

In step 306, the AS 104 applies a statistical occlusion model to the video to determine a first likelihood that there is an occluded entity present in the video. The statistical occlusion model may be a learned model that is trained using a set of labeled videos, some of which include occluded entities and some of which do not, as discussed above. In one example, the first likelihood that the video obtained in step 306 includes an occluded entity may be based (at least in part) on a statistical measure of a distance between features of the video and features of the set of labeled videos. In one example, the statistical measure may include one or more of a Euclidean distance, an inverse cosine metric, a Procrustes distance, a Cremer-Rao metric, or the like.

In step 308, the AS 104 applies a contextual occlusion model to the video to determine a second likelihood that there is an occluded entity present in the video. In one example, the second likelihood that the video obtained in step 306 includes an occluded entity may be based (at least in part) on the visibility of other entities in the video that are contextually associated (e.g., socially, color/texture/shape co-occurrence-wise, or the like) with entities that are not seen.

In step 310, the AS 104 combines the first likelihood and the second likelihood in order to infer an overall likelihood that an occlusion is present. In one example, the first likelihood may be assigned a first weight and the second likelihood may be assigned a second weight, so that the overall likelihood comprises a weighted combination of the first likelihood and the second likelihood. In one example, one or both of the first eight and the second weight may be zero.

In step 312, the AS 104 determines whether it is likely that an occluded entity is present in the video, based on the overall likelihood. For example, the AS 104 may determine whether the overall likelihood is less than a threshold (e.g., less than fifty percent indicates not likely) or more than the threshold (e.g., more than fifty percent indicates likely). In one example, this threshold is adjustable.

If the AS 104 concludes in step 312 that an occluded entity is not likely to be present, then the method 300 returns to step 304 and continues to analyze the received video for occluded entities as new frames of the video are received.

If, however, the AS 104 concludes in step 312 that an occluded entity is likely to be present, then the AS 104 proceeds to step 314. In step 314, the AS 104 sends a signal to the drone from which the video was received instructing the drone to change its orientation. Changing the orientation of the drone will change the field of view that is captured in the video, and may thus allow a previously occluded entity to be more visible. In one example, the orientation is adjustable in up to three dimensions (e.g., including translation and rotation). The method 300 then returns to step 304 and re-computes the likelihood that an occluded entity is present in the video as new frames of the video are received from the new orientation of the drone (e.g., from the new field of view). Thus, steps 304-314 may be repeated any number of times until the occluded entity is no longer occluded, or until it is determined that an occluded entity is unlikely to be present.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a mobile device or an application server could be implemented as illustrated in FIG. 4.

As depicted in FIG. 4, the system 400 comprises a hardware processor element 402, a memory 404, a module 405 for inferring the presence of an occluded entity in a video captured via drone, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for inferring the presence of an occluded entity in a video captured via drone may include circuitry and/or logic for performing special purpose functions relating to monitoring, analyzing, and providing feedback relating to a drone's current field of view and potentially occluded entities therein. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a neurotransmitter, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for inferring the presence of an occluded entity in a video captured via drone (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for inferring the presence of an occluded entity in a video captured via drone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
obtaining a video that is captured by a drone monitoring a field of view of a scene;
determining a first inference of presence of an occluded entity that is likely to be present in the video based on a statistical reasoning of the video;
determining a second inference of presence of an occluded entity that is likely to be present in the video based on a contextual modeling of the video;
combining the first inference of presence and the second inference of presence to obtain an overall inference of presence;
determining that the occluded entity is likely to be present in the video based on the overall inference of presence; and
sending, in response to the determining that the occluded entity is likely to be present in the video, a signal to the drone to instruct the drone to adjust orientation of the drone to make the occluded entity more visible.

2. The method of claim 1, wherein the video is obtained from the drone in real time as frames of the video are captured by the drone.

3. The method of claim 1, wherein the statistical reasoning infers a presence of the occluded entity based on expected characteristics of occlusions.

4. The method of claim 3, wherein the expected characteristics are learned from a set of training data using a machine learning process, wherein the set of training data includes a plurality of videos, and wherein each video of the plurality of videos is labeled to indicate whether or not each video depicts an occlusion.

5. The method of claim 1, wherein the contextual modeling infers a presence of the occluded entity based on a presence of other entities in the field of view that are contextually related to the occluded entity.

6. The method of claim 5, wherein the other entities that are contextually related are learned from a set of training data using a machine learning process.

7. The method of claim 1, wherein the combining comprises assigning a first weight to the first inference of presence and a second weight to the second inference of presence.

8. The method of claim 1, further comprising:
repeating at least the obtaining and the determining subsequent to the sending, in order to determine whether the occluded entity is visible in a new field of view captured from the orientation after the orientation has been adjusted.

9. The method of claim 1, wherein the orientation is adjustable in up to three dimensions.

10. A device, comprising:
a processor; and
a computer-readable medium storing instructions which, when executed by the processor, cause the processor to perform operations comprising:
obtaining a video that is captured by a drone monitoring a field of view of a scene;
determining a first inference of presence of an occluded entity that is likely to be present in the video based on a statistical reasoning of the video;
determining a second inference of presence of an occluded entity that is likely to be present in the video based on a contextual modeling of the video;
combining the first inference of presence and the second inference of presence to obtain an overall inference of presence;
determining that the occluded entity is likely to be present in the video based on the overall inference of presence; and
sending, in response to the determining that the occluded entity is likely to be present in the video, a signal to the drone to instruct the drone to adjust orientation of the drone to make the occluded entity more visible.

11. The device of claim 10, wherein the video is obtained from the drone in real time as frames of the video are captured by the drone.

12. The device of claim 10, wherein the statistical reasoning infers a presence of the occluded entity based on expected characteristics of occlusions.

13. The device of claim 12, wherein the expected characteristics are learned from a set of training data using a machine learning process, wherein the set of training data includes a plurality of videos, and wherein each video of the plurality of videos is labeled to indicate whether or not the each video depicts an occlusion.

14. The device of claim 10, wherein the contextual modeling infers a presence of the occluded entity based on a presence of other entities in the field of view that are contextually related to the occluded entity.

15. The device of claim 14, wherein the other entities that are contextually related are learned from a set of training data using a machine learning process.

16. The device of claim 10, wherein the combining comprises assigning a first weight to the first inference of presence and a second weight to the second inference of presence.

17. The device of claim 10, wherein the operations further comprise:
repeating at least the obtaining and the determining subsequent to the sending, in order to determine whether the occluded entity is visible in a new field of view captured from the orientation after the orientation has been adjusted.

18. A non-transitory computer-readable storage medium storing instructions which, when executed by a processor, cause the processor to perform operations, the operations comprising:
obtaining a video that is captured by a drone monitoring a field of view of a scene;
determining a first inference of presence of an occluded entity that is likely to be present in the video based on a statistical reasoning of the video;
determining a second inference of presence of an occluded entity that is likely to be present in the video based on a contextual modeling of the video;
combining the first inference of presence and the second inference of presence to obtain an overall inference of presence;
determining that the occluded entity is likely to be present in the video based on the overall inference of presence; and
sending, in response to the determining that the occluded entity is likely to be present in the video, a signal to the drone to instruct the drone to adjust orientation of the drone to make the occluded entity more visible.

* * * * *